United States Patent
Xiong et al.

(10) Patent No.: US 10,424,334 B1
(45) Date of Patent: Sep. 24, 2019

(54) DATA STORAGE DEVICE FORMATTING A DISK SURFACE WITH A WRITE FORMAT AND A READ FORMAT

(71) Applicant: Western Digital Technologies, Inc., San Jose, CA (US)

(72) Inventors: Shaomin Xiong, Fremont, CA (US); Toshiki Hirano, San Jose, CA (US); Na Wang, San Jose, CA (US); Vipin A. Vitikkate, Pleasanton, CA (US); William B. Boyle, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/242,868

(22) Filed: Jan. 8, 2019

(51) Int. Cl.
*G11B 5/09* (2006.01)
*G11B 19/12* (2006.01)
*G11B 20/12* (2006.01)

(52) U.S. Cl.
CPC ........ *G11B 19/125* (2013.01); *G11B 20/1217* (2013.01); *G11B 2020/1218* (2013.01)

(58) Field of Classification Search
None
See application file for complete search history.

(56) References Cited

U.S. PATENT DOCUMENTS

| | | | |
|---|---|---|---|
| 6,185,058 B1 * | 2/2001 | Dobbek | G11B 20/1217 360/48 |
| 7,752,491 B1 | 7/2010 | Liikanen et al. | |
| 8,605,384 B1 * | 12/2013 | Liu | G11B 5/455 360/78.05 |
| 8,643,971 B1 * | 2/2014 | Biskeborn | G11B 5/00891 360/55 |
| 8,699,175 B1 * | 4/2014 | Olds | G11B 20/1217 360/78.14 |
| 9,424,879 B1 | 8/2016 | Li | |
| 2002/0071555 A1 * | 6/2002 | Akiyama | G11B 20/00086 380/203 |
| 2005/0030854 A1 * | 2/2005 | Lee | G11B 7/0079 369/47.22 |
| 2013/0148225 A1 * | 6/2013 | Coker | G11B 19/045 360/31 |
| 2015/0012802 A1 * | 1/2015 | Avila | G06F 12/0246 714/773 |

OTHER PUBLICATIONS

Bill Boyle, Curtis E. Stevens "Realms API", T10 Technical Committee, Oct. 31, 2017, http://www.t10.org.

* cited by examiner

*Primary Examiner* — Peter Vincent Agustin

(57) ABSTRACT

A data storage device is disclosed comprising a first disk surface comprising a plurality of data tracks, and a first head actuated over the first disk surface. First data is written to the first disk surface based on a first format. At least part of the first disk surface is reformatted based on a second format, wherein the second format defines a lower recording density for the first disk surface as compared to a recording density defined by the first format. After reformatting the at least part of the first disk surface, second data is written to the first disk surface based on the second format and the first data is read from the first disk surface based on the first format.

20 Claims, 6 Drawing Sheets

DATA STORAGE DEVICE FORMATTING A DISK SURFACE WITH A WRITE FORMAT AND A READ FORMAT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator.

DETAILED DESCRIPTION

Figure 2A:
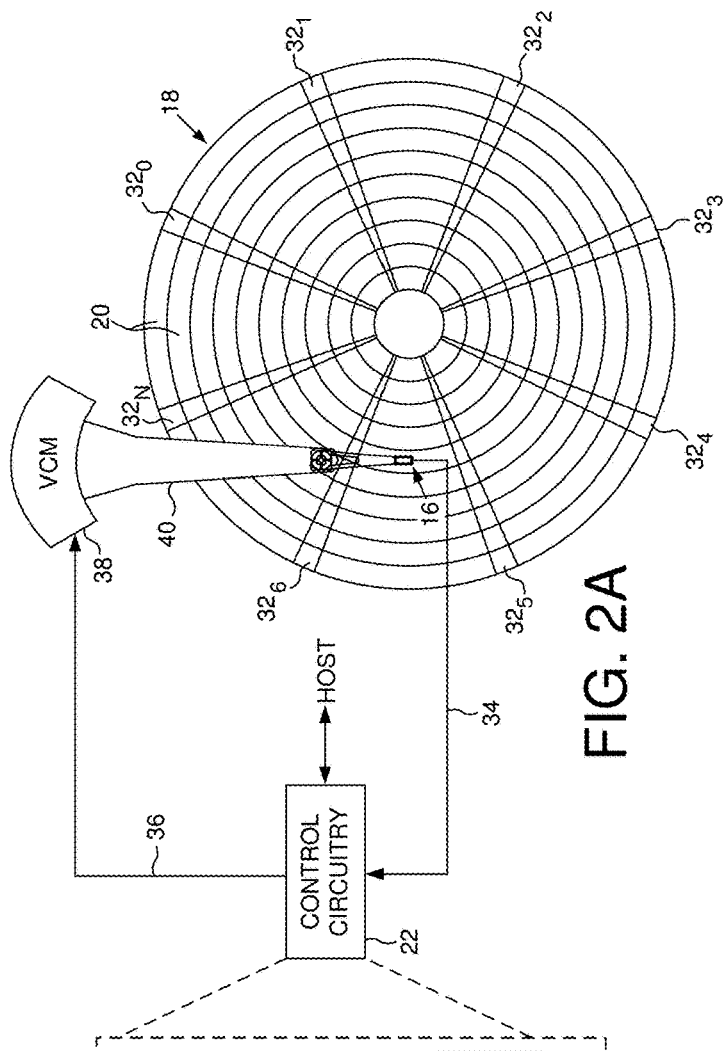
FIGS. 2A and 2B show a data storage device in the form of a disk drive according to an embodiment comprising a head actuated over a disk.
Figure 2B:
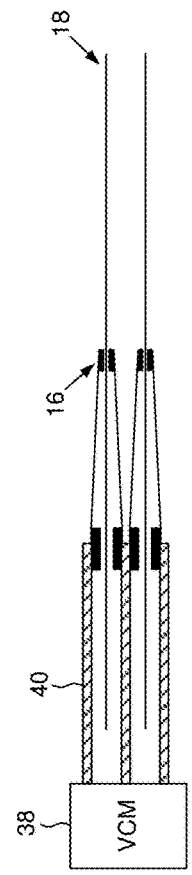
Figure 2C:
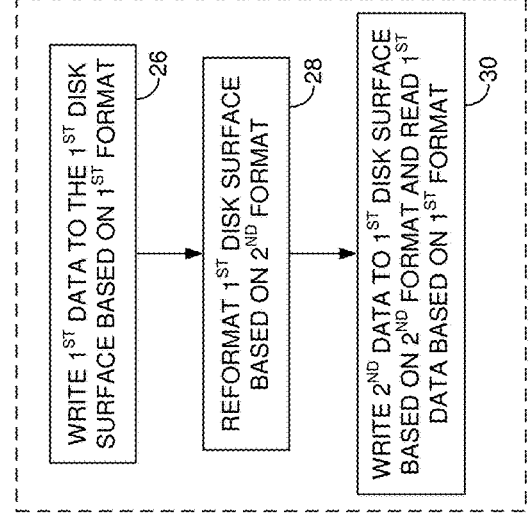
FIG. 2C is a flow diagram according to an embodiment wherein when a disk surface is reformatted to a lower recording density format, previously written data is read from the disk surface based on the old format and newly written data is written to the disk surface based on the new format.

FIGS. 2A and 2B show a data storage device in the form of a disk drive according to an embodiment comprising a head 16 actuated over a disk 18 comprising a plurality of data tracks 20. The disk drive further comprises control circuitry 22 configured to execute the flow diagram of FIG. 2C, wherein first data is written to the first disk surface based on a first format (block 26). The first disk surface is reformatted based on a second format (block 28), wherein the second format defines a lower recording density for the first disk surface as compared to a recording density defined by the first format. Second data is then written to the first disk surface based on the second format, and the first data is read from the first disk surface based on the first format (block 30).

Figure 1:
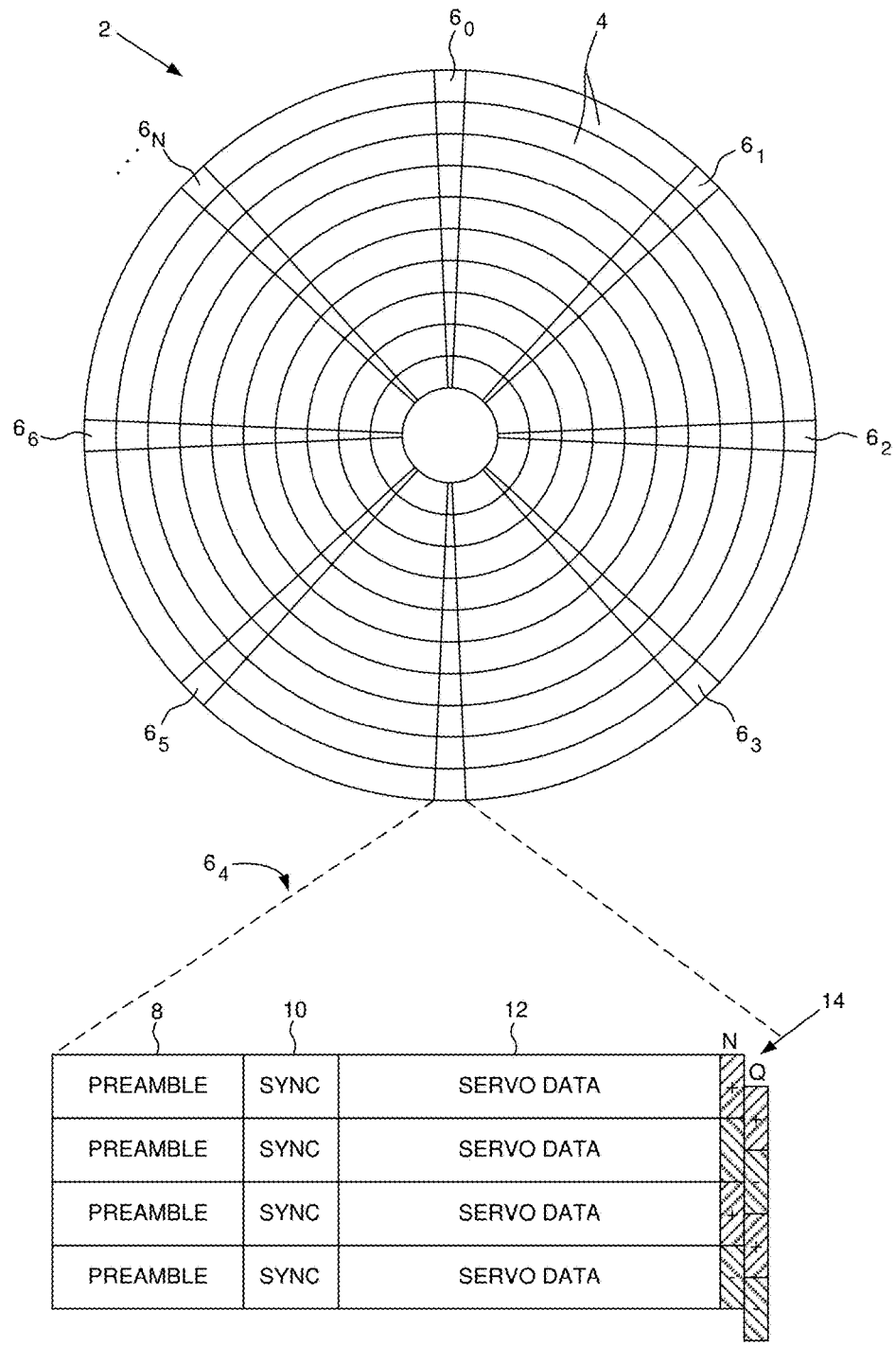
FIG. 1 shows a prior art disk format comprising a plurality of servo tracks defined by servo sectors.

In the embodiment of FIG. 2A, the disk 18 comprises a plurality of servo sectors 32$_0$-32$_N$ that define a plurality of servo tracks, wherein the data tracks 20 are defined relative to the servo tracks at the same or different radial density. The control circuitry 22 processes a read signal 34 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 36 applied to a VCM 38 which rotates an actuator arm 40 about a pivot in order to actuate the head radially over the disk in a direction that reduces the PES. The servo sectors 32$_0$-32$_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the control circuitry 22 formats a disk surface based on a target recording density by defining a radial density of the data tracks (tracks per inch (TPI)) and by defining a linear density of the data tracks (bits per inch (BPI)). In one embodiment, a disk surface may be formatted to comprise a plurality of zones each comprising a number of the data tracks, wherein the linear data rate (write/read rate) varies across the zones (e.g., increases toward the outer diameter of the disk surface in order to maintain a substantially constant BPI across the disk surface). In one embodiment, formatting a disk surface also involves mapping logical block addresses (LBAs) to physical block addresses (PBAs) assigned to physical data sectors of each data track. In one embodiment, the LBA to PBA mapping for a particular format may remain substantially static to facilitate a random access mode, and in another embodiment the format may involve dynamic LBA to PBA mapping to facilitate a continuous mode (e.g., when recording streams of data such as video streams). In one embodiment a disk surface may be reformatted to a lower recording density by reducing one or both of the TPI or BPI in each zone. As described in more detail below, a pad area may be reserved on at least one disk surface to facilitate the reformatting of one or more disk surfaces based on a lower recording density format without reducing the overall capacity of the disk drive. That is, the PBA mapping may be extended into the pad area so that the capacity of the disk drive in terms of the total number of PBAs remains the same after reformatting one or more disk surfaces.

Figure 3:
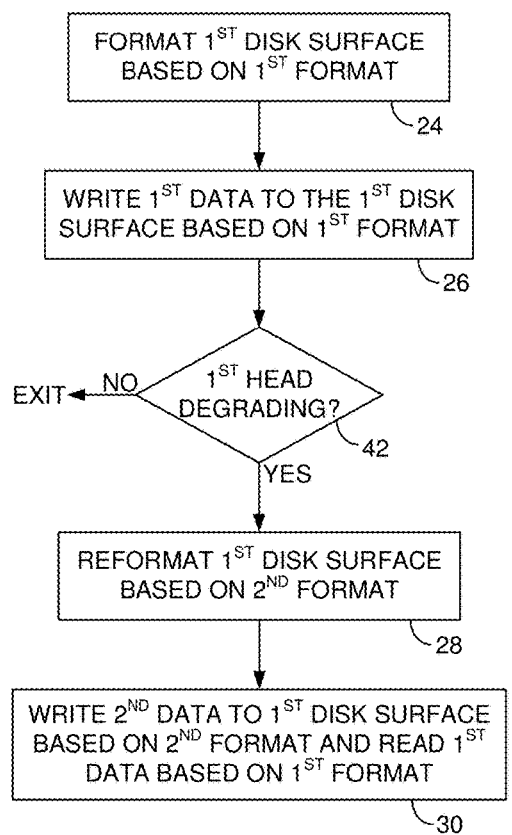
FIG. 3 is a flow diagram according to an embodiment wherein a disk surface may be reformatted when the respective head degrades.

A disk surface may be reformatted to a lower recording density format for any suitable reasons, wherein in an embodiment shown in the flow diagram of FIG. 3 which is an extension of the flow diagram of FIG. 2B, a disk surface may be reformatted to a lower recording density format when a degradation of the head 16 is detected (block 42). A degradation of the head 16 may be detected in any suitable manner, including to detect a degradation of a write component (e.g., a laser diode in HAMR or a spin torque oscillator (STO) in MAMR) or a degradation of a read component (e.g., a magnetoresistive element). In one embodiment, degradation of a laser diode in HAMR may be detected by detecting a degradation in output power of the laser diode relative to a bias signal applied to the laser diode. In MAMR, degradation of an STO may be detected by detecting the amplitude of a bias signal that causes the STO to begin oscillating. In another embodiment, the output temperature of either a laser diode or an STO may be monitored in order to detected degradation of either component. In yet another embodiment, degradation of a write component or a read component in the head 16 may be detected by reading back data written to the disk and evaluating the quality of the written data. Accordingly, in one embodiment when degradation of the head is detected, the corresponding disk surface is reformatted to a lower recording density format to ensure the integrity of the recorded data while preserving at least some capacity of the disk surface (as compared to decommissioning the entire disk surface).

In one embodiment, when reformatting a disk surface to a lower capacity the control circuitry 22 defines two formats for the disk surface: a first format that corresponds to the higher recording density format that was used to write data prior to the reformatting; and a second lower recording density format used to write/read data after the reformatting. In this manner, the first format enables the control circuitry 22 to read previously written data without having to relocate the data to a different disk surface, or without having to read\rewrite the data based on the lower recording density format. For example, in one embodiment the control circuitry 22 may identify areas of a disk surface that may be storing what is referred to as "cold" data, such as a video stream that is typically written one time. After reformatting the disk surface based on the lower recording density format, in one embodiment the previously written cold data can remain on the disk surface and accessed (read) based on the original format (rather than relocate the data to a different disk surface or rewrite the data at the lower recording density of the same disk surface). In one embodiment, cold data may be retained at the higher recording density format of a reformatted disk surface when degradation of one or more write components of the head is detected rather than degradation of a read component. When cold data is invalidated, such as when a video stream is overwritten or deleted, new data may be written to the cold area of the disk surface based on the lower recording density format (the second format).

In some embodiments, data may be recorded to the disk drive in a substantially continuous stream, such as in a video surveillance application where the video stream from one or more surveillance cameras may be continuously (or motion triggered) recorded to the disk drive. For continuous recording applications, in one embodiment the stream data received by the disk drive is written to a circular buffer (that may span one or more disk surfaces) using a dynamic LBA mapping technique. In an embodiment shown in FIG. 4A, a circular buffer may be defined by a starting PBA (PBA_S) and an ending PBA (PBA_E), wherein the LBAs are mapped dynamically to these PBAs. The video stream (or streams from multiple cameras) are recorded to the circular buffer based on the higher density format, and when the end of the circular buffer is reached, the head wraps back to the beginning of the circular buffer and continues writing new stream data by overwriting old stream data (invalid data). Accordingly in this embodiment substantially all of the available recording area of the disk(s) is used to record the stream data (except for the reserved pad area which is used to store stream data after reformatting a disk surface).

Figure 4A:
FIGS. 4A-4F show an embodiment wherein when data is written to a disk surface as a circular buffer, a pad area and then a last part of the circular buffer may be written based on a lower recording density format when a degraded head is detected.
Figure 4B:
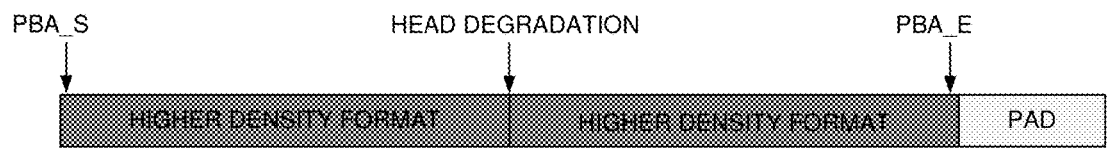

In an example embodiment shown in FIG. 4B, while writing data to the circular buffer a degradation of a head may be detected triggering a reformat of a disk surface to the dual format described above (a higher recording density format and a lower recording density format). New data to be written going forward is written at the lower recording density format whereas previously written data is retained at the higher recording density format as illustrated in FIG. 4A, thereby enabling the previously written data to be accessed (read) based on the original format.

Figure 4C:
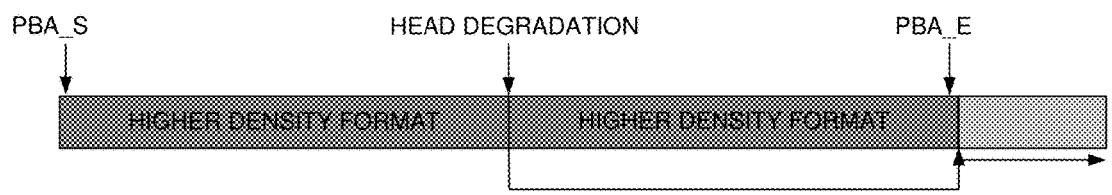
Figure 4D:
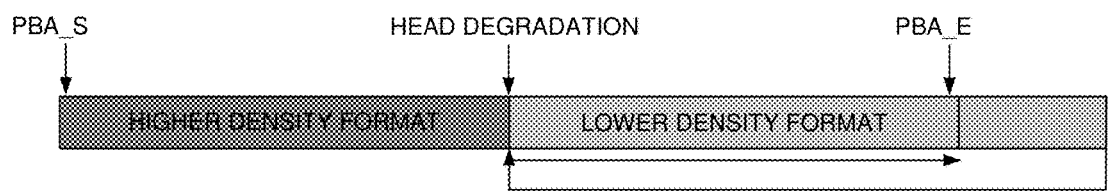
Figure 4E:
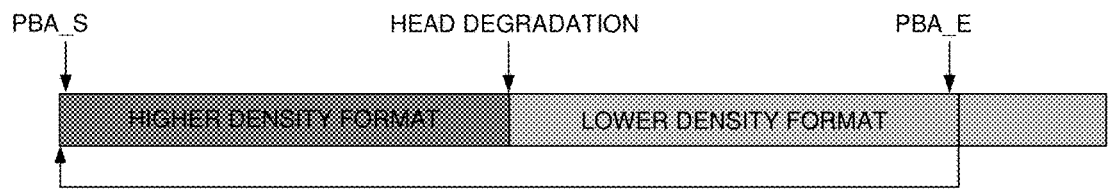
Figure 4F:
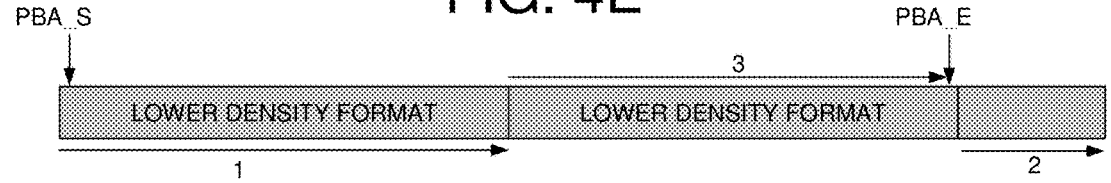

In an embodiment shown in FIG. 4C, when the head degradation is detected while writing data to the circular buffer, the writing of the stream data is interrupted and the head is positioned to the beginning of the pad area. New stream data is then written to the pad area at the lower recording density format as shown in FIG. 4C. When the head reaches the end of the pad area, the head is repositioned to the location within the circular buffer where the head degradation was detected as illustrated in FIG. 4D. New stream data is then written based on the lower recording density format up to the beginning of the pad area. As shown in FIG. 4E, the head then wraps back to the beginning of the circular buffer and continues writing new stream data based on the lower recording density format until the entire circular buffer (and pad area) has been written at the lower recording density format as shown in FIG. 4F. Up until the previously written older stream data is overwritten by new stream data, the previously written stream data may be read from the disk surface using the higher recording density format. Accordingly, this embodiment ensures a certain interval of recorded stream data (e.g., thirty days) while also enabling the reformatting of a disk surface to a lower recoding density format (e.g., due to a degrading head).

In the embodiment of FIGS. 4A-4F when a head degradation is detected, interrupting the contiguous writing of the circular buffer in order to write new stream data to the pad area ensures the valid stream data recorded at the higher recording density format is not overwritten. If new stream data were not first written to the pad area, the head would effectively be writing new stream data faster than the previously written older stream data written at the higher recording density. That is, the head would begin to overwrite valid stream data due to the lower recording density format. Writing new stream data first to the pad area ensures the head does not "catchup" to the valid stream data once the head returns to writing new stream data at the point the writing was interrupted.

In the embodiment of FIG. 4F, the sequence for writing the circular buffer going forward becomes non-contiguous as illustrated by the numbered arrows. That is, going forward the circular buffer is continuously rewritten based on the non-contiguous sequence that was defined when the pad area is written after detecting degradation of the head. According in the embodiments described herein, a circular buffer may be written as a contiguous or non-contiguous sequence of physical recording segments defined on the disk surface(s). In the embodiment shown in FIG. 4A, a pad area is defined at the end of the circular buffer; however, in other embodiments the pad area may be defined at any suitable location, such as at the beginning or middle of the circular buffer shown in FIG. 4A. In another embodiment described below, the pad area may be defined on a disk surface different from the one being reformatted.

In the embodiment of FIGS. 4A-4F, the size of the pad area is configured so that the entire pad area is consumed after the first reformatting of the disk surface. In other embodiments, the size of the pad area may be larger to facilitate reformatting the disk surface multiple times as the head may experience multiple levels of degradation. According, in one embodiment only a portion of the pad area may be written after the first reformatting, thereby saving the remaining portion of the pad area for one or more additional reformattings. In an embodiment described below, the size of the pad area may be configured to facilitate the reformatting of multiple disk surfaces; that is, the pad area may be segmented such that each segment corresponds to a reformatted disk surface. Also in an embodiment described below, new stream data may be written to the pad area based on a higher recording density format when the pad area is located on a disk surface different from the disk surface being reformatted.

Figure 5A:
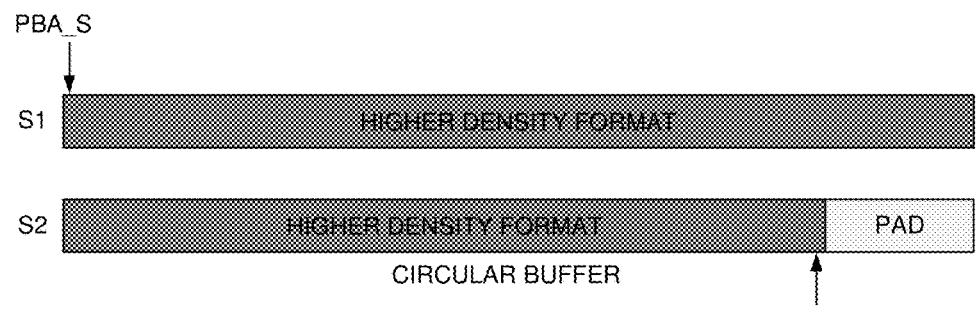
FIGS. 5A-5D show an embodiment wherein a circular buffer may span multiple disk surfaces, wherein the pad area may be reserved on one disk surface to facilitate the reformatting of any one (or more) disk surfaces.

In one embodiment, the circular buffer employed in a continuous recording application may span multiple disk surfaces. An example of this embodiment is shown in FIG. 5A wherein the circular buffer spans two disk surfaces (S1 and S2), such as a top and bottom disk surface of the same disk. In other embodiments, the circular buffer may span more than two disk surfaces, such as all four disk surfaces in the embodiment of FIG. 2B in a disk drive comprising two disks. In the embodiment of FIG. 5A, a pad area is defined at the end of the circular buffer on the second disk surface S2. FIG. 5A also illustrates how stream data may be continuously written to the circular buffer until the entire circular buffer is full of stream data, in which case the head wraps to the beginning of the circular buffer and begins overwriting old (invalid) stream data with new stream data.

Figure 5B:
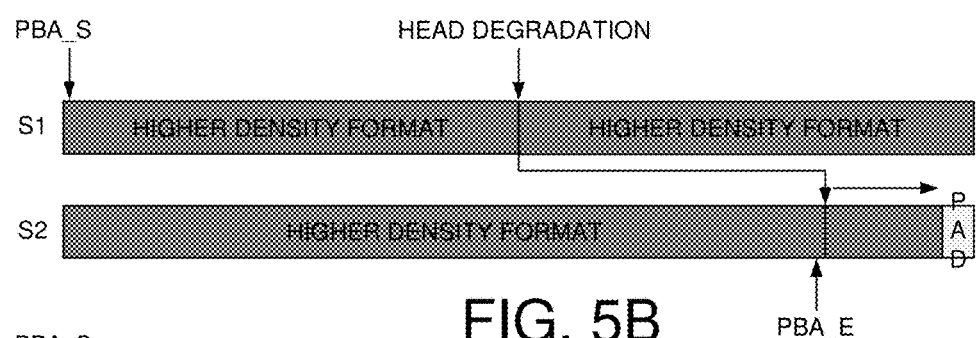
Figure 5C:
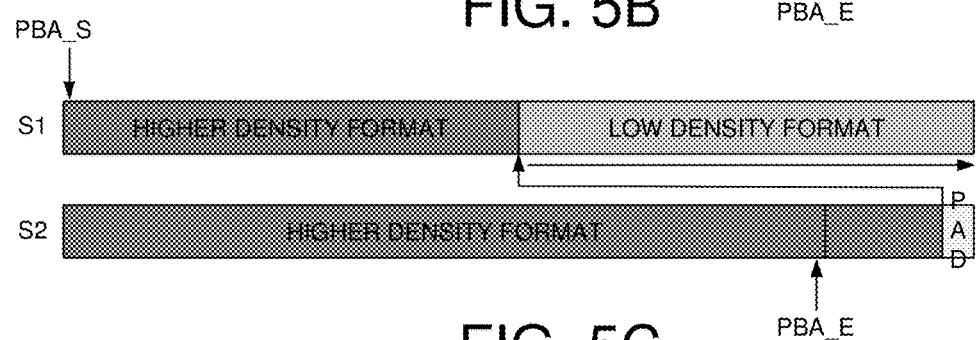
Figure 5D:
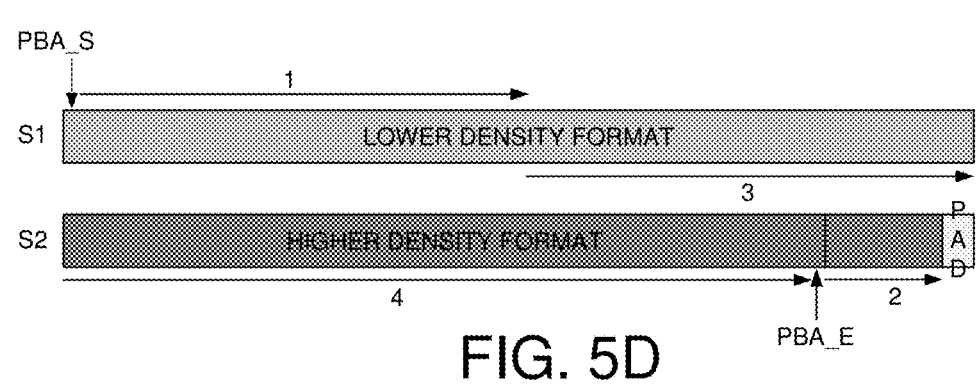

When a head degradation is detected while writing the stream data to the first disk surface using a first head as shown in FIG. 5B, the writing to the first disk surface is interrupted and the second head is positioned over the pad area on the second disk surface. New stream data is then written to the pad area based on the higher recording density format as shown in FIG. 5C. When a sufficient amount of stream data has been written to the pad area to account for the lost capacity of the first disk surface due to reformatting the first disk surface, the first head is repositioned over the first disk surface where the writing was interrupted, and new stream data written to the first disk surface based on the lower density recording format as shown in FIG. 5C. When the first head reaches the "end" of the first disk surface, new stream data is written to the second disk surface based on the higher density recording format as shown in FIG. 5D. FIG. 5D also illustrates the new sequence for writing the stream data to the circular buffer going forward; that is, by writing the circular buffer in a non-contiguous sequence as illustrated by the numbered arrows in FIG. 5D.

In the example of FIGS. 5A-5D, a portion of the pad area is left over after reformatting the first disk surface. This is because the pad area is written at the higher recording density of the second disk surface. In one embodiment, the left over pad area may be repurposed after reformatting the first disk surface, such using this area for spare data sectors. If in this embodiment the degradation of the second head is detected such that the second disk surface needs reformatting, the pad area would be written at the lower recording density format of the second disk surface such that substantially the entire pad area would be consumed after the reformatting.

In on embodiment, the pad area reserved on one of the disk surfaces may be used to reformat any one of a number of disk surfaces. Referring again to the example of FIG. 5A-5D, a disk drive employing four (or more) disk surfaces may reformat any one of the disk surfaces using the pad area recorded on a single disk surface. In this manner, the pad area may be used to compensate for the degradation of any head of a multiple head system using a single pad area. This may be of particular benefit when statistically only a single head may typically degrade in a multiple head system, where the head that ultimately degrades is a random occurrence across all the heads.

In one embodiment, the size of the pad area reserved on one of the disk surfaces may be configured to facilitate more than one head degrading in a multiple head system. For example, the size of the pad area may be configured to facilitate reformatting two disk surfaces in a four head system, or configured to facilitate reformatting all four disk surfaces in a four head system. In yet another embodiment, the size of the pad area may be configured to facilitate multiple reformattings of the same disk surface based on multiple levels of head degradation. In still another embodiment, how the pad area is used may be determined "on-the-fly" based on the current need; that is, whether multiple heads are degrading or whether a single head is experiencing multiple levels of degradation.

Figure 6A:
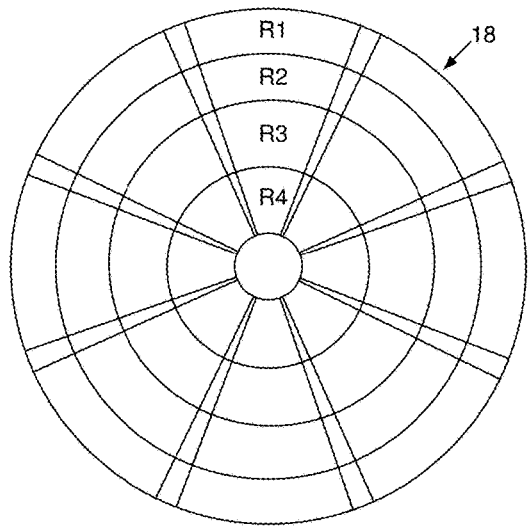
FIGS. 6A-6D show an embodiment wherein a disk surface may be divided into a plurality of realms, and each realm is overwritten at a lower recording density format after the disk surface is reformatted.
Figure 6B:
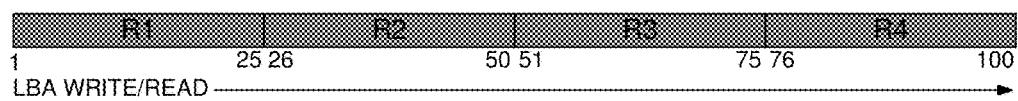
Figure 6C:
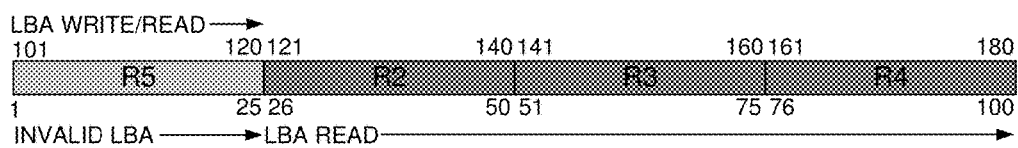
Figure 6D:
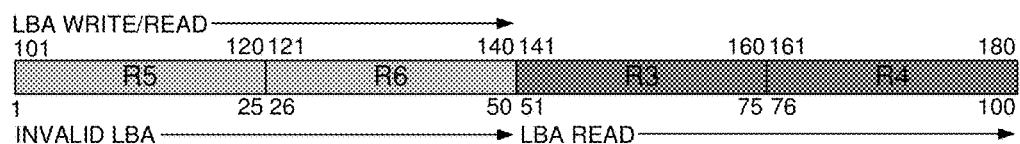

FIG. 6A shows an embodiment wherein a disk surface may be divided into a number of realms (realms R1-R4 in this example), where each ream stores a predetermined number of PBAs each accessed through a corresponding LBA. In an example shown in FIG. 6B, the disk surface is initially formatted based on a higher recording density format such that each realm stores 25 LBAs. For example, realm R1 is defined as storing data for LBAs 1-25, realm R2 is defined as storing data for LBAs 26-50, and so on. When it is necessary to reformat the disk surface based on a lower recording density format (e.g., when a degraded write component is detected), the disk surface is overwritten with new data at the lower recording density based on a realm resolution. For example, in FIG. 6 the realm R1 may be overwritten with new data at the lower recording density by activating a new realm R5 that stores data for LBAs 101-120 (20 LBAs due to the lower recording density). After writing the new realm R5 at the lower recording density, the LBAs 101-120 of realm R5 may be written/read based on the lower recording density format, whereas the LBAs of the remaining realms (R2-R4) may be read (only) based on the higher recording density format. The LBAs 1-25 of the old realm R1 are designated as invalid (no longer accessible by the host). As the disk drive is used over time, another realm (e.g., realm R2) may be overwritten with new data at the lower recording density by activating a new realm R6 that stores LBAs 121-140 (20 LBAs due to the lower recording density) as shown in FIG. 6D. After writing the new realm R6 at the lower recording density, the LBAs 121-140 of realm R6 may be written/read based on the lower recording density format, whereas the LBAs of the remaining realms (R3-R4) may be read (only) based on the higher recording density format. The LBAs 26-50 of the old realm R2 are designated as invalid (no longer accessible by the host). Accordingly in this embodiment, dynamically adjusting of the LBA address range facilitates the reformatting of a disk surface in segments over time as compared to reformatting the entire disk surface at once. In one embodiment, dynamically adjusting the LBA address range is implemented using a prior art protocol referred to as Dynamic Hybrid Shingled Magnetic Recording (DHSMR) which enables the host to access a disk drive that is implementing a dynamic adjustment of the LBA address range.

In one embodiment, the disk surface shown in FIG. 6A may store multiple files for the host as compared to a single continuous stream file as in a surveillance application. Accordingly, each realm shown in FIG. 6A may be written in a somewhat random manner. Referring again to the example of FIG. 6B, when the disk surface is reformatted the LBAs 1-100 are designated as "read only" and this designation is communicated to the host. Accordingly, if the host intends to overwrite part of a file that is initially assigned to a realm in this LBA range (e.g., LBAs 5-10 of realm R1), the host writes the new data for the file to the LBAs of a different realm (e.g, a realm on a different disk surface). The corresponding old data stored in the old realm (e.g., LBAs 5-10 of realm R1) are designated as storing "invalid" data. In one embodiment, the control circuitry of the disk drive may execute a garbage collection operation wherein valid data stored in a realm (e.g., realm R1) may be relocated to a different realm, thereby allowing new data to be written to the garbage collected realm at the lower recording density format. For example, after garbage collecting realm R1, the availability of the new realm R5 shown in FIG. 6C may be communicated to the host so that the host may use the new realm to store new data (for an existing or new file). In one embodiment, the realms of a reformatted disk surface may be garbage collected in any suitable sequence until the entire disk surface has been rewritten at the lower recording density format.

In one embodiment, the control circuitry may generate multiple formats (e.g., higher and lower recording density formats) for at least part of a disk surface (e.g., a realm). The control circuitry may then format the at least part of the disk surface by activating one or more of the formats. For example, when the at least part of the disk surface is reformatted from a higher to lower recording density format, the control circuitry may simply activate the lower recording density format for that part of the disk surface. In certain embodiments described above, at least part of the disk surface may have multiple formats activated, such as a higher recording density format for reading previously written data prior to reformatting, and a lower recording density format for writing/reading new data after the reformatting as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a first disk surface comprising a plurality of data tracks;
    a first head actuated over the first disk surface; and
    control circuitry configured to:
        write first data to the first disk surface based on a first format;
        reformat at least part of the first disk surface based on a second format, wherein the second format defines a lower recording density for the first disk surface as compared to a recording density defined by the first format; and
        after reformatting the at least part of the first disk surface, write second data to the first disk surface based on the second format and read the first data from the first disk surface based on the first format.

2. The data storage device as recited in claim 1, wherein the control circuitry is further configured to:
    detect a degradation of the first head; and
    reformat the at least part of the first disk surface in response to detecting the degradation of the first head.

3. The data storage device as recited in claim 1, wherein after reformatting the at least part of the first disk surface, the control circuitry is further configured to overwrite the first data with the second data based on the second format.

4. The data storage device as recited in claim 1, wherein after reformatting the at least part of the first disk surface, the control circuitry is further configured to read the second data based on the second format.

5. The data storage device as recited in claim 1, wherein the control circuitry is further configured to reformat the at least part of the first disk surface by at least one of decreasing a radial density of the data tracks on the first disk surface or decreasing a linear density of data written to the data tracks.

6. The data storage device as recited in claim 1, wherein the control circuitry is further configured to:
    define a circular buffer by mapping a plurality of logical block addresses (LBAs) to physical block addresses (PBAs) of the data tracks;
    define a pad area relative to a boundary of the circular buffer by reserving at least part of the first disk surface; and
    after reformatting the at least part of the first disk surface, configuring the circular buffer to include at least part of the pad area.

7. The data storage device as recited in claim 6, wherein after reformatting the at least part of the first disk surface, the control circuitry is further configured to first write data to the pad area prior to writing data to a different part of the circular buffer.

8. The data storage device as recited in claim 1, further comprising a second disk surface comprising a plurality of data tracks and a second head actuated over the second disk surface, wherein the control circuitry is further configured to:
    define a circular buffer by mapping a plurality of logical block addresses (LBAs) to physical block addresses (PBAs) of the data tracks of the first disk surface and the second disk surface;
    define a pad area relative to a boundary of the circular buffer by reserving at least part of the second disk surface; and
    after reformatting the at least part of the first disk surface, configuring the circular buffer to include at least part of the pad area.

9. The data storage device as recited in claim 8, wherein after reformatting the at least part of the first disk surface, the control circuitry is further configured to first write data to the pad area prior to writing data to a different part of the circular buffer.

10. The data storage device as recited in claim 1, wherein the control circuitry is further configured to:
    define a plurality of realms on the first disk surface including a first realm;
    map a first plurality of logical block addresses (LBAs) to physical block addresses (PBAs) of each realm; and
    after reformatting the at least part of the first disk surface, activate a new realm for the at least part of the first disk surface that at least partially overlaps the first realm wherein a second plurality of LBAs are mapped to PBAs of the new realm.

11. The data storage device as recited in claim 10, wherein after reformatting the at least part of the first disk surface, the control circuitry is further configured to designate the LBAs of the first realm as read only until activating the new realm.

12. The data storage device as recited in claim 11, wherein the control circuitry is further configured to activate the new realm in order to write data to the PBAs of the new realm.

13. The data storage device as recited in claim 10, wherein after reformatting the at least part of the first disk surface and activating the new realm, the control circuitry is further configured to designate the LBAs of the first realm as invalid.

14. A data storage device comprising:
    a disk surface comprising a plurality of data tracks;
    a head actuated over the disk surface; and
    control circuitry configured to:
        define a plurality of realms on the disk surface including a first realm;
        map a first plurality of logical block addresses (LBAs) to physical block addresses (PBAs) of each realm;
        write first data to the first realm based on a first format;
        reformat at least part of the disk surface based on a second format, wherein the second format defines a lower recording density for the disk surface as compared to a recording density defined by the first format; and
        after reformatting the at least part of the disk surface, activate a new realm for the at least part of the disk surface that at least partially overlaps the first realm wherein a second plurality of LBAs are mapped to PBAs of the new realm.

15. The data storage device as recited in claim 14, wherein after reformatting the at least part of the disk surface, the control circuitry is further configured to designate the LBAs of the first realm as read only until activating the new realm.

16. The data storage device as recited in claim 15, wherein the control circuitry is further configured to activate the new realm in order to write data to the PBAs of the new realm.

17. The data storage device as recited in claim 14, wherein after reformatting the at least part of the disk surface and activating the new realm, the control circuitry is further configured to designate the LBAs of the first realm as invalid.

18. A method of operating a data storage device, the method comprising:
   writing first data to a first part of a disk surface based on a first format;
   reformatting the first part of the disk surface based on a second format, wherein the second format defines a lower recording density for the disk surface as compared to a recording density defined by the first format;
   after reformatting the first part of the disk surface, reading the first data from the first disk surface based on the first format; and
   after reading the first data from the first disk surface, overwriting the first data with second data based on the second format.

19. The method as recited in claim 18, further comprising:
   detecting a degradation of a head actuated over the disk surface; and
   reformatting the first part of the disk surface in response to detecting the degradation of the head.

20. The method as recited in claim 18, further comprising reading the second data based on the second format.

* * * * *